United States Patent [19]

Hodges

[11] 4,342,062
[45] Jul. 27, 1982

[54] SEQUENCE NETWORK CIRCUITS FOR PROTECTIVE RELAYING APPLICATIONS

[75] Inventor: Merwyn E. Hodges, Springfield, Pa.

[73] Assignee: General Electric Company, Philadelphia, Pa.

[21] Appl. No.: 297,542

[22] Filed: Aug. 31, 1981

Related U.S. Application Data

[63] Continuation of Ser. No. 41,137, May 21, 1979, abandoned.

[51] Int. Cl.³ .................... H02H 3/34; H02H 3/26
[52] U.S. Cl. .................................. 361/76; 361/77; 361/87; 307/127; 324/86; 324/108
[58] Field of Search ............... 361/76, 77, 87, 86, 361/78, 79, 85, 80, 82, 84; 324/86, 87, 108, 83 A; 307/127

[56] References Cited

U.S. PATENT DOCUMENTS 3,992,651 11/1976 Hodges ........................... 361/76
4,067,053 1/1978 Chow ............................ 361/77 X

*Primary Examiner*—Patrick R. Salce
*Attorney, Agent, or Firm*—William Freedman; John P. McMahon

[57] ABSTRACT

Sequence network circuits are provided for use in three-phase protective relaying applications. In one embodiment, the circuit includes input circuit means for receiving input signals, one of which comprises a reference input signal, and signal processing means for processing such input signals. The signal processing means includes an operational amplifier and a single capacitor. A plurality of resistors couple the input signals to the operational amplifier. The value of the resistors and the capacitor are selected such that the output signal of the operational amplifier is representative of the quadrature voltage, relative to the reference input signal, and shifted 90° lagging with respect to its normal phase position. Other embodiments are disclosed.

23 Claims, 2 Drawing Figures

SEQUENCE NETWORK CIRCUITS FOR PROTECTIVE RELAYING APPLICATIONS

This is a continuation of application Ser. No. 041,137, filed May 21, 1979, and now abandoned.

BACKGROUND OF THE INVENTION

The present invention relates to sequence network circuits, and more particularly to such circuits for use in protective relaying applications.

The present invention employs the well known theory of symmetrical components. This theory is explained in sustantial detail in the textbook, Symmetrical Components, by Wagner and Evans, published by McGraw-Hill in 1933.

The theory of symmetrical components is widely employed in protective relaying applications. In this connection, see the following U.S. Patents:

U.S. Pat. No. 4,034,269-Wilkinson, issued July 5, 1977; U.S. Pat. No. 4,091,433-Wilkinson, issued May 23, 1978, and U.S. Pat. No. 3,992,651-Hodges, issued Nov. 16, 1976.

One problem with several available sequence network circuits is that such circuits often include an undesirable number of components, such as operational amplifiers and capacitors, which can contribute extraneous transient output signals and increased cost per function. Also, such available circuits can not be conveniently modified to vary the circuit output characteristics as may be necessary when employing such a circuit in different types of protective relaying applications. Further, it would be desirable, for certain protective relaying applications, to provide simple sequence network circuits, such as: quadrature voltage circuits and positive sequence enhancement (positive sequence mix) circuits wherein the input signals to such latter circuits could be either phase-to-neutral or phase-to-phase signals.

Accordingly, it is a general object of this invention to provide sequence network circuits having a small number of components.

It is another object of this invention to provide such sequence network circuits which can be conviently modified for use in different protective relaying applications.

It is another object of this invention to provide such sequence network circuits which include quadrature voltage circuits and positive sequence enhancement circuits.

SUMMARY

In carrying out one form of my invention, I provide a sequence network circuit for use in combination with a three-phase (X, Y, Z) a-c power system. The circuit includes input circuit means for receiving: (1) three separate input signals respectively representative of the phase-to-neutral voltage in the three phases (X, Y, Z) and a fourth input signal representative of the negative of the zero sequence voltage therein; or (2) three separate input signals respectively representative of the line current in the three phases (X, Y, Z) and a fourth input signal representative of the negative of the zero sequence current in the system.

The circuit inlcudes signal processing means, having:

1. an operational amplifier having a non-inverting input adapted to be coupled to a reference potential and an inverting input coupled to its output through a feedback resistor $R_F$, 2. a capacitor C, one side of which is adapted to be coupled to the reference potential and the other side of which is coupled to a junction 14, 3. a resistor $R_5$ coupled between the junction 14 and the inverting input of the operational amplifier with a summing point 16 being provided between resistor $R_5$ and the inverting input, 4. a resistor $R_{1A}$ coupling a first one of the three input signals to summing point 16 and a resistor $R_{1B}$ coupling the first input signal to junction 14, the first input signal comprising a reference input signal, 5. a resistor $R_{2A}$ coupling a second one of the three input signals to summing point 16, 6. a resistor $R_{3B}$ coupling a third one of the three input signals to junction 14, 7. a resistor $R_{4A}$ coupling the fourth input signal to summing point 16 and a resistor $R_{4B}$ coupling the fourth input signal to junction 14, wherein the values of the components in the circuit are selected such that the output signal E of the operational amplifier is representative of the quadrature voltage, relative to the reference input signal of 4. above, and shifted 90° lagging with respect to its normal phase position.

Other forms of sequence network circuits are provided.

DETAILED DESCRIPTION OF THE INVENTION

Figure 1:
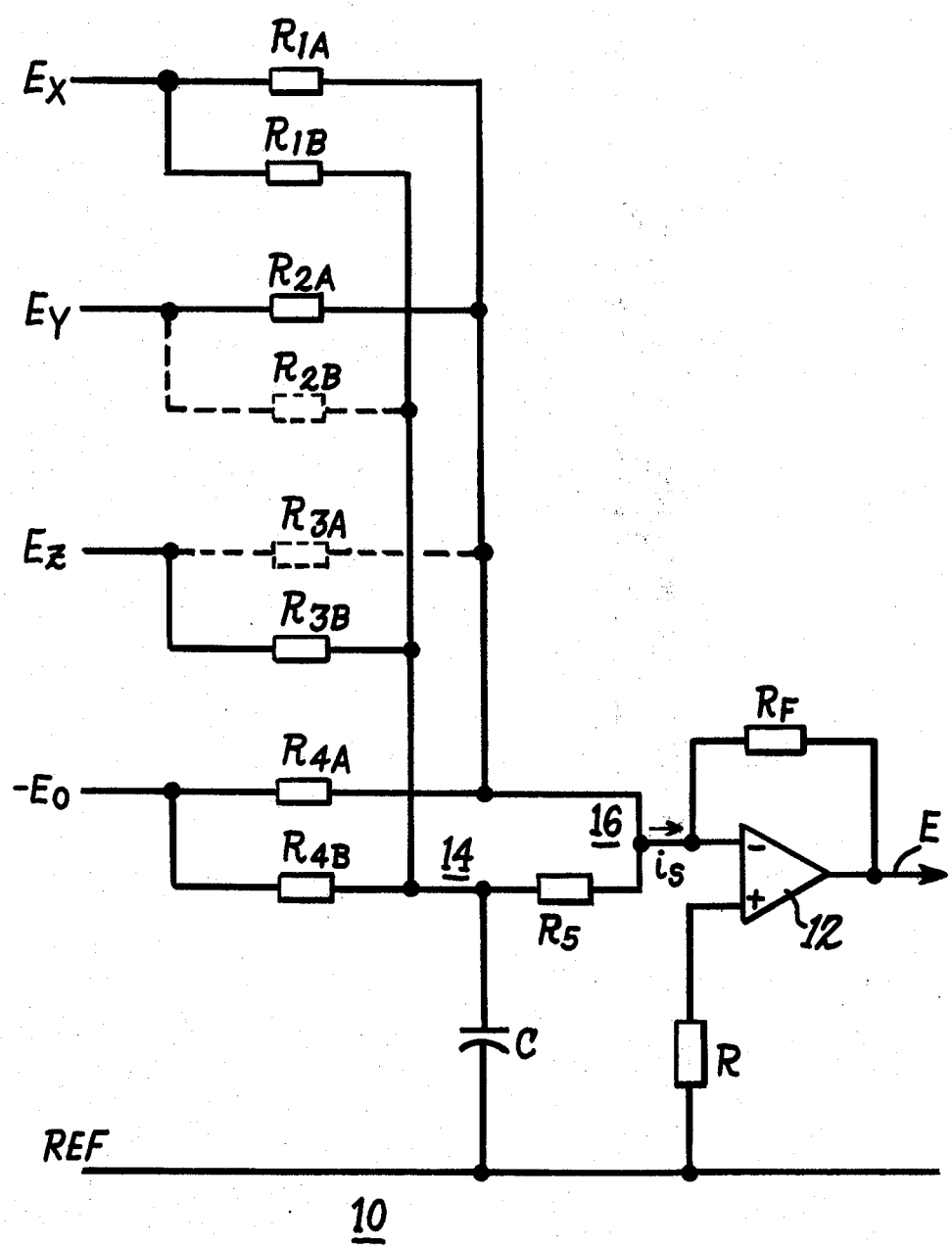
FIG. 1 is a circuit diagram of one form of sequence network circuit of the present invention.

Referring initially to FIG. 1, one form of sequence network circuit of the present invention is generally designated 10. The sequence network circuit 10 includes an operational amplifier 12 having its non-inverting input coupled through resistor R to a reference potential. The sequence network circuit receives four input voltage signals: $E_X$, $E_Y$, $E_Z$, and $-E_O$. These input signals are respectively representative of either: the phase-to-neutral voltage in phases X, Y, Z of a three-phase a-c power system (which may, for example, respectively represent phases A, B, C) and the negative of the zero sequence voltage therein; or the line currents and the negative of the zero sequence current flowing in a three-phase a-c power system, all of such input signals having a common reference potential. The sequence network circuit 10 includes a single capacitor C, one side of which is coupled to junction 14 and the other side of which is coupled to the reference potential.

A feedback resistor $R_F$ is coupled between the inverting input and the output of operational amplifier 12. Resistor $R_5$ is coupled between junction 14 and a summing point 16. Input signal $-E_O$ is coupled through resistor $R_{4A}$ to summing point 16 and through resistor $R_{4B}$ to junction 14. Input signal $E_X$ is coupled through resistor $R_{1A}$ to summing point 16 and through resistor $R_{1B}$ to junction 14. Input signal $E_Y$ is coupled through resistor $R_{2A}$ to summing point 16. Input signal $E_Z$ is coupled through resistor $R_{3B}$ to junction 14. For purposes which will be discussed later in connection with another form of sequence network circuit of the present invention, resistors $R_{2B}$ and $R_{3A}$ are shown in dashed lines in FIG. 1. More particularly, resistor $R_{2B}$ couples input signal $E_Y$ to junction 14 and resistor $R_{3A}$ couples signal $E_Z$ to summing point 16.

The output signal E of the operational amplifier 2 of FIG. 1 is established by the following relation:

$$E = -i_s R_F \qquad (1)$$

where $i_s$ is the current flowing out of summing point 16.

The current $i_s$ flowing out of summing point 16 may be generally expressed as:

$$i_s = \left(\frac{E_X}{R_{1A}} + \frac{E_Y}{R_{2A}} + \frac{E_Z}{R_{3A}} - \frac{E_0}{R_{4A}}\right) + \qquad (2)$$

$$\left(\frac{E_X}{R_{1B}} + \frac{E_Y}{R_{2B}} + \frac{E_Z}{R_{3B}} - \frac{E_0}{R_{4B}}\right) \times R_P \times$$

$$\left(\frac{1}{R_P + \frac{-jX_C R_5}{R_5 - jX_C}}\right) \times \left(\frac{-jX_C R_5}{R_5 - jX_C}\right) \times \frac{1}{R_5}$$

$$i_s = \left(\frac{E_X}{R_{1A}} + \frac{E_Y}{R_{2A}} + \frac{E_Z}{R_{3A}} - \frac{E_0}{R_{4A}}\right) + \qquad (3)$$

$$\left(\frac{E_X}{R_{1B}} + \frac{E_Y}{R_{2B}} + \frac{E_Z}{R_{3B}} - \frac{E_0}{R_{4B}}\right) \times \left(\frac{1}{1 + R_5/R_P}\right) \times$$

$$\left(\frac{1}{1 + j\left(\frac{1/X_C}{1/R_P + 1/R_5}\right)}\right)$$

wherein: $X_C$ represents the reactance of capacitor C at system frequency, and $R_P$ is defined by:

$$(1/R_P = 1/R_{1B}) + (1/R_{2B}) + (1/R_{3B}) + (1/R_{4B}) \qquad (4)$$

Assigning appropriate values to the components of the sequence network circuit 10 of FIG. 1 results in various useful output signals E. For example, consider Case #1 in which the following values are assigned to circuit 10:

Case #1

Quadrature Voltage at $-90°$
(Phase-to-Neutral Input Signals)

| Component | Relationship | Exemplary Value (60 hertz) |
|---|---|---|
| Resistor $R_{1A}$ | $(64/3)X_C$ | 56.2KΩ |
| Resistor $R_{2A}$ | $(32/3)X_C$ | 28.0KΩ |
| Resistor $R_{3A}$ | ∞ | Omit |
| Resistor $R_{4A}$ | $(64/9)X_C$ | 18.7KΩ |
| Resistor $R_{1B}$ | $(8)(1 + S)X_C$ | 28.7KΩ |
| Resistor $R_{2B}$ | ∞ | Omit |
| Resistor $R_{3B}$ | $(4)(1 + S)X_C$ | 14.3KΩ |
| Resistor $R_{4B}$ | $(8/3)(1 + S)X_C$ | 9.53KΩ |
| Resistor $R_5$ | $(4/3)(1 - S)X_C$ | 2.21KΩ |
| Resistor $R_F$ | $(64/3)X_C$ (For 1 PU Output) | 56.2KΩ |
| Capacitor C | $1/(2\pi f X_C)$ | 1.00 μf | wherein:

S is assigned the fixed numeric value:

$$S = \sqrt{1 - \sqrt{3}}/2 = 0.36603$$

$X_C$ is assigned any arbitrary value. One exemplary arbitrary value of $X_C$ is:

$$10^3/(0.12\pi) \text{ ohms} = 2.65258 \text{ K}\Omega.$$

Now, substituting the Case #1 relationships in expressions (3) and (4) results in:

$$i_s = \frac{3}{64X_C}(E_X + 2E_Y - 3E_o) + \qquad (5)$$

$$\frac{1}{16X_C}(E_X + 2E_Z - 3E_o) = \frac{1}{1 + j/\sqrt{3}}$$

$$i_s = \frac{3}{64X_C}(E_X + 2E_Y - 3E_o) + \qquad (6)$$

$$\frac{1}{32X_C}(E_X + 2E_Z - 3E_o)\left(\sqrt{3} \angle -30°\right)$$

Substituting symmetrical components of the voltages $E_X$, $E_Y$, and $E_Z$, as determined from symmetrical component theory, into expression (6) results in:

$$i_s = (3/64X_C)[E_{X1} - E_{X2}] \qquad (7)$$

$$E = -(3/64X_C)R_F[E_{X1} - E_{X2}] \qquad (8)$$

wherein $E_{X1}$ represents the positive sequence component of phase X voltage and $E_{X2}$ represents the negative sequence component of phase X voltage.

Substituting the relationship for $R_F$ from Case #1 for one per unit output (1 PU) into expression (8):

$$E = -[E_{X1} - E_{X2}] = +[E_{X1} - E_{X2}] \angle -180° \qquad (9)$$

By definition, quadrature voltage is expressed, with respect to phase X, as:

$$E_{QX} = \frac{1}{\sqrt{3}}[E_Y - E_Z] = [E_{X1} - E_{X2}] \angle -90° \qquad (10)$$

Therefore, comparing expressions (9) and (10), it can be seen that the sequence network circuit output signal E for Case #1 may be expressed as:

$$E = E_{QX} \angle -90°, \qquad (11)$$

representing the quadrature voltage $E_{QX}$ with respect to the reference phase-to-neutral input signal (phase X), and shifted 90° lagging with respect to its normal phase position.

Referring again to sequence network circuit 10 of FIG. 1, consider Case #2:

Case #2

Positive Sequence Mix at 180°
(Phase-to-Neutral Input Signals)

| Component | Relationship | Exemplary Value (60 hertz) |
|---|---|---|
| $R_{1A}$ | $(K_1/(1 + K_1))(16/\sqrt{3})X_C$ | 5.62KΩ |

Case #2-continued

Positive Sequence Mix at 180°
(Phase-to-Neutral Input Signals)

| Component | Relationship | Exemplary Value (60 hertz) |
|---|---|---|
| $R_{2A}$ | $(16/\sqrt{3})X_C$ | 24.3KΩ |
| $R_{3A}$ | ∞ | Omit |
| $R_{4A}$ | $(8/\sqrt{3})X_C$ | 12.1KΩ |
| $R_{1B}$ | $(12/\sqrt{3})X_C$ | 18.2KΩ |
| $R_{2B}$ | ∞ | Omit |
| $R_{3B}$ | $(6/\sqrt{3})X_C$ | 9.09KΩ |
| $R_{4B}$ | $(4/\sqrt{3})X_C$ | 6.04KΩ |
| $R_5$ | $(2/\sqrt{3})X_C$ | 3.01KΩ |
| $R_F$ | $(K_1/(1+K_1))(16/\sqrt{3})X_C$ (For 1PU Output) | 5.62KΩ |
| C | $1/(2\pi f X_C)$ | 1.00 μf | wherein:

$X_C$ is assigned any arbitrary value, e.g., $X_C = 10^3/(0.12\lambda)$ ohms = 2.65258 KΩ

For this Case, $K_1$ may be chosen to have any value in accordance with: $_{-1} \leq (1/K_1) < \infty$. $K_1$ has been assigned the exemplary value 0.3 for reasons which relate to one utilization of this sequence network circuit.

It can be shown that, under Case #2, using the one per unit output (1PU) relationship for $R_F$, output signal E is:

$$E = -\left(\frac{1}{1 + K_1}\right)[E_X + K_1 E_{X1}], \quad (12)$$

representing the phase-to-neutral voltage of phase X summed with $K_1$ times the positive sequence component of phase X voltage, the sum having a 180° phase reversal with respect to the input signal $E_X$.

For a balanced three-phase system, $E_X = E_{X1}$ so, for such a condition of input signals, $$E_{BAL} = -\frac{1}{(1 + K_1)}[E_{X1} + K_1 E_{X1}] = -E_{X1} \quad (13)$$

Therefore, one per unit output, as defined by the relationship for $R_F$, is the output magnitude when the input signals represent a balanced three-phase voltage set.

Referring again to FIG. 1, consider Case #3:

Case #3

Positive Sequences Mix at 0°
(Phase-to-Neutral Input Signals)

| Component | Relationship | Exemplary Value (60 hertz) |
|---|---|---|
| $R_{1A}$ | ∞ | Omit |
| $R_{2A}$ | $(2+K_1)(16/\sqrt{3})X_C$ | 56.2KΩ |
| $R_{3A}$ | $((2+K_1)/(1+K_1))(16/\sqrt{3})X_C$ | 43.2KΩ |

Case #3-continued

Positive Sequences Mix at 0°
(Phase-to-Neutral Input Signals)

| Component | Relationship | Exemplary Value (60 hertz) |
|---|---|---|
| $R_{4A}$ | $((2+K_1)/(3+K_1))(16/\sqrt{3})X_C$ | 16.9KΩ |
| $R_{1B}$ | $(12/\sqrt{3})X_C$ | 18.2KΩ |
| $R_{2B}$ | $((2+K_1)/(1+K_1))(6/\sqrt{3})X_C$ | 16.2KΩ |
| $R_{3B}$ | $(2+K_1)(6/\sqrt{3})X_C$ | 21.0KΩ |
| $R_{4B}$ | $(4/\sqrt{3})X_C$ | 6.04KΩ |
| $R_5$ | $(2/\sqrt{3})X_C$ | 3.01KΩ |
| $R_F$ | $((2+K_1)/(1+K_1))(16/\sqrt{3})X_C$ (1PU) | 43.2KΩ |
| C | $1/(2\pi f X_C)$ | 1.00 μf | wherein $X_C$ has any arbitrary value, e.g., $X_C = (10^3/0.12\pi)$ ohms = 2.65258 KΩ and $K_1$ may be chosen in accordance with: $-1 \leq K_1$. As in Case #2, $K_1$ has been assigned the exemplary value of 0.3.

It can be shown that, under Case #3, using the one per unit output relationship for $R_F$, output signal E is:

$$E = +\frac{1}{(1 + K_1)}[E_X + K_1 E_{X1}], \quad (14)$$

which is similar to expression (12) of Case #2 but at 0° with respect to the input signal $E_X$.

For a balanced three-phase system, $E_X = E_{X1}$ so, for such a case:

$$E_{BAL} = +E_{X1} \quad (15)$$

Therefore, one per unit output, as defined by the relationship for $R_F$, is the output magnitude when the input signals represent a balanced three-phase voltage set.

Figure 2:
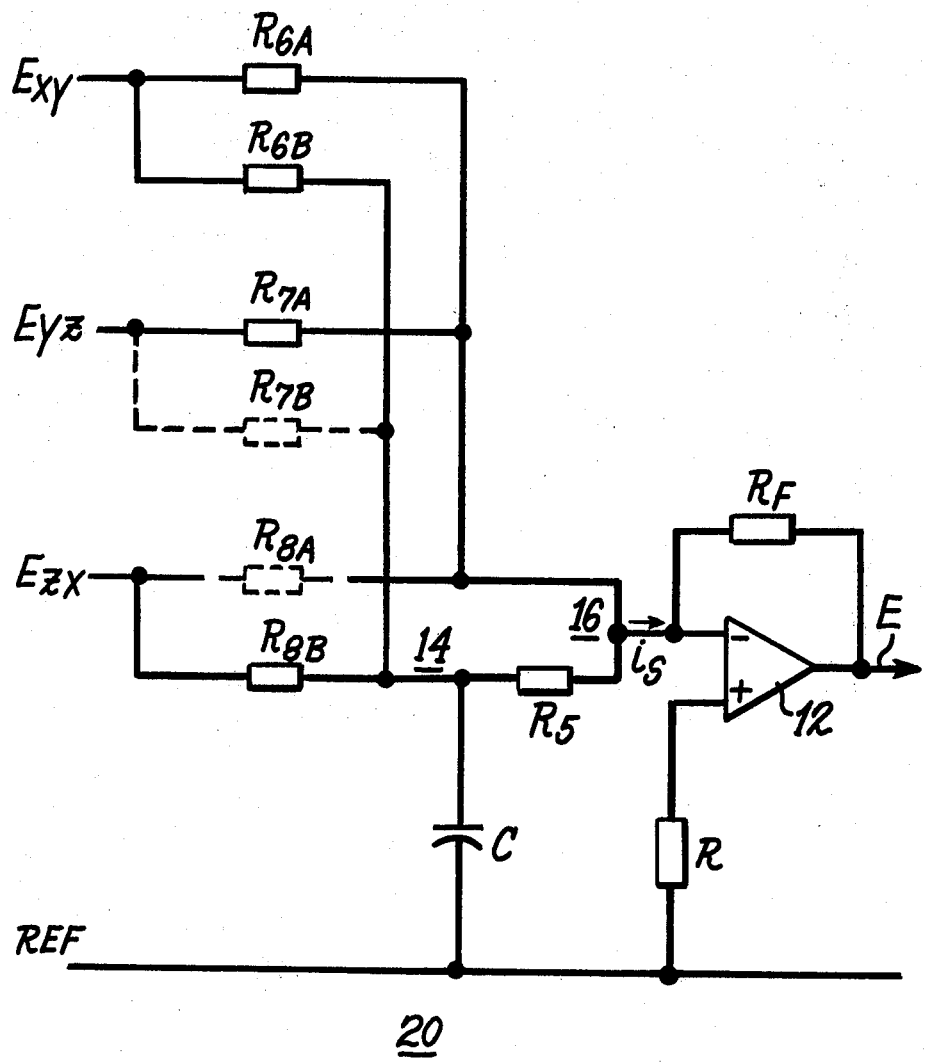
FIG. 2 is a circuit diagram of another form of sequence network circuit of the present invention.

Referring now to FIG. 2, another form of sequence network circuit of the present invention is generally designated 20. The network circuit 20 of FIG. 2 is similar to the network circuit 10 of FIG. 1 so that, whenever possible, like reference numerals have been employed to represent like elements.

Network circuit 20 receives three input voltage signals: $E_{XY}$, $E_{YZ}$, $E_{ZX}$, respectively representative of the phase-to-phase voltages between phases X, Y, Z; or respectively representative of the delta currents flowing in phases X, Y, Z. Input signal $E_{XY}$ is coupled through resistor $R_{6A}$ to summing point 16 and coupled through resistor $R_{6B}$ to junction point 14. Input signal $E_{YZ}$ is coupled through resistor $R_{7A}$ to summing point 16 and through resistor $R_{7B}$ to junction 14. Input signal $E_{ZY}$ is coupled through resistor $R_{8A}$ to summing point 16 and through resistor $R_{8B}$ to junction 14. For reasons which will be later apparent, resistors $R_{7B}$ and $R_{8A}$ are shown in dashed lines.

Consider Case #4 in which the following values are assigned to the circuit 20:

Case #4

Positive Sequence Mix at 180°
(Phase-to-Phase Input Signals)

| Component | Relationship | Exemplary Value (60 hertz) |
|---|---|---|
| $R_{6A}$ | $(K_1/(1 + K_1)) (8/\sqrt{3}) X_C$ | 2.87KΩ |
| $R_{7A}$ | $(8/\sqrt{3}) X_C$ | 12.7KΩ |
| $R_{8A}$ | ∞ | Omit |
| $R_{6B}$ | $(6/\sqrt{3}) X_C$ | 9.09KΩ |
| $R_{7B}$ | ∞ | Omit |
| $R_{8B}$ | $(3/\sqrt{3}) X_C$ | 4.64KΩ |
| $R_5$ | $(2/\sqrt{3}) X_C$ | 3.01KΩ |
| $R_F$ | $(K_1/(1 + K_1)) (8/\sqrt{3}) X_C$ (1PU) | 2.87KΩ |
| C | $1/(2\pi f X_C)$ | 1.00 μf | wherein $X_C$ and $K_1$ are chosen as in Case #2 for the determination of the exemplary values.

It can be shown, in a manner related to that hereinbefore discussed in connection with Cases #1 through #3, that under Case #4, output signal E of circuit 20 is:

$$E = -\frac{\sqrt{3} R_F}{8 K_1 X_C} [E_{XY} + K_1 E_{XY1}], \quad (16)$$

where $E_{XY1}$ is the positive sequence component of input voltage $E_{XY}$.

Substituting the one per unit output relationship for $R_F$ into expression (16) results in:

$$E = -\frac{1}{(1 + K_1)} [E_{XY} + K_1 E_{XY1}] \quad (17)$$

The output signal E of expression (17) represents the phase voltage between phases X and Y summed with $K_1$ times the positive sequence component of the phase-to-phase voltage $E_{XY}$, the sum having a 180° phase reversal with respect to the input signal $E_{XY}$.

For a balanced three-phase system, $E_{XY}=E_{XY1}$, so, for such a case:

$$E_{BAL} = -E_{XY1}, \quad (18)$$

where one per unit output, as defined by the relationship for $R_F$, is the output magnitude when the input signals represent a balanced three-phase voltage set.

Consider Case #5 in which the following values are assigned to the circuit 20:

Case #5

Positive Sequence Mix at 0°
(Phase-to-Phase Input Signals)

| Component | Relationship | Exemplary Value (60 hertz) |
|---|---|---|
| $R_{6A}$ | ∞ | Omit |
| $R_{7A}$ | $(2 + K_1) (8/\sqrt{3}) X_C$ | 28.0KΩ |
| $R_{8A}$ | $((2 + K_1)/(1 + K_1)) (8/\sqrt{3}) X_C$ | 21.5KΩ |
| $R_{6B}$ | $(6/\sqrt{3}) X_C$ | 9.09KΩ |
| $R_{7B}$ | $((2 + K_1)/(1 + K_1)) (3/\sqrt{3}) X_C$ | 8.06KΩ |
| $R_{8B}$ | $(2 + K_1) (3/\sqrt{3}) X_C$ | 10.5KΩ |

Case #5-continued

Positive Sequence Mix at 0°
(Phase-to-Phase Input Signals)

| Component | Relationship | Exemplary Value (60 hertz) |
|---|---|---|
| $R_5$ | $(2/\sqrt{3}) X_C$ | 3.01KΩ |
| $R_F$ | $((2 + K_1)/(1 + K_1)) (8/\sqrt{3}) X_C$ (1PU) | 21.5KΩ |
| C | $1/(2\pi f X_C)$ | 1.00 μf | wherein $X_C$ and $K_1$ are chosen as in Case #3 for the determination of the exemplary values.

It can be shown that, under Case #5, output signal E of circuit 20 is:

$$E = +\frac{\sqrt{3} R_F}{8(2 + K_1)X_C} [E_{XY} + K_1 E_{XY1}], \quad (19)$$

or, when the one per unit output relationship for $R_F$ is substituted, $$E = +\frac{1}{(1 + K_1)} [E_{XY} + K_1 E_{XY1}] \quad (20)$$

The output signal E of expressions (19) and (20) represent the same voltage as do the output voltage for the relationships given for Case #4 but includes 180° phase reversal thereto without the use of an additional inverting amplifier.

For a balanced three-phase system, $E_{XY}=E_{XY1}$, so, for such a case:

$$E_{BAL} = +E_{XY1}, \quad (21)$$

where one per unit output, as defined by the relationship for $R_F$, is the output magnitude when the input signals represent a balanced three-phase voltage set.

GENERAL CONSIDERATIONS

It is to be appreciated that the sequence network circuits of the present invention are not limited to all of the details recited in Cases #1 through #5. More particularly, the sequence network circuits 10 and 20 of FIGS. 1 and 2 may be made applicable to a power source frequency other than the exemplary 60 hertz system. For example, 50 hertz sequence network circuits 10 and 20 can be obtained by employing a capacitor C of 1.2 μf instead of the exemplary capacitor value hereinbefore assigned in Cases 190 1 through #5, with no other component changes. Also, values of the feedback resistor $R_F$ may be freely chosen to provide any desired output magnitude. For example, the output magnitude may be made different from the generally preferred one per unit value simply by changing the value of resistor $R_F$ by the same ratio.

An advantage of the sequence network circuits of the present invention over available sequence network circuits is that, in the present invention, each circuit may include only one capacitor and only one operational amplifier. Also, the circuits 10 and 20 of FIGS. 1 and 2 can be conveniently modified to obtain various useful output signals, as discussed hereinbefore in connection with Cases 190 1 through 190 5 . Another advantage of the sequence network circuits of the present invention is the reduced circuit generation of transient responses, which transient responses represent erroneous information to successive protective relaying measurement circuits. This advantage is accomplished through the presence of the single reactive element C, and the short time constant associated therewith.

Exemplary protective relaying applications in which the sequence network circuits of the present invention may be employed are discussed in copending patent applications of: Ser. No. 879,653, filed Feb. 21, 1978, entitled, "Ground Distance Relay Employing Phase Comparator Measurement"; and Ser. No. 032,303, filed Apr. 23, 1979, entitled, "Static Distance Relays With Improved Polarizing Signal". Each of these copending applications is assigned to the assignee of the present application and is hereby incorporated by reference into the present application.

Also, although the present invention has been illustrated as employing phase-to-neutral and phase-to-phase voltage input signals, it is equally applicable to input voltage signals representative of current signals.

The relationships of resistor $R_F$ of FIGS. 1 & 2 may be conveniently chosen for the one per unit output value, as previously described. In this connection, the value of $K_1$ in Cases 2-5 should not be chosen as $-1$. More particularly, when $K_1$ is assigned the value of $-1$, the output signal E will not contain any of the positive sequence component of the three-phase input signal set, and one per unit output cannot be defined as previously stated. For $K_1 = -1$, the output signals E in Cases #2, #3 will each be proportional to $(E_{X2}+E_0) \angle 0°$ with the output signals in Cases #4, #5 being proportional to $E_{XY2} \angle 0°$. Further, the stated permissible values of $K_1$ for Cases #2-#5 include an infinitely large value. More particularly, for $K_1 = \infty$, and for the one per unit relationships shown for $R_F$, the output signals E for Cases #2, #3, #4, #5 respectively become: $E_{X1} \angle 180°$; $E_{X1} \angle 0°$; $E_{XY1} \angle \frac{1}{2}°$; and $E_{XY1} \angle 0°$.

For some applications, it may be desirable to reassign the identities of phases X, Y, Z to be other than A, B, C. For example, X, Y, Z, may respectively represent B, C, A or C, A, B, such reassignments merely constituting a "rolling" of phase connections to respectively obtain phase B, C as reference, while maintaining the same phase sequence. Similarly, for those applications where phase-to-phase input signals are employed, the phase connections can also be "rolled".

Another feature of the present invention is that the interchange of input signal connections to phases Y and Z provide additional useful output signals E. For example, with respect to Case #1 relationships, interchanging input signal connections to phases Y and Z provides an output signal which is 180° out-of-phase with the signal obtained using Case #1 connections. Further, if such an interchange of phase Y and Z connections is made for Cases #2 and #3, the result is the direct substitution of the negative sequence component $E_{X2}$ for the positive sequence component $E_{X1}$ shown in expressions (12) and (14). One per unit output, under these conditions, is defined as the output magnitude when the input signals represent a balanced reversed phase sequence three-phase voltage set. Similarly, for those applications where phase-to-phase input signals are employed, the YZ and ZX input connections can also be interchanged.

While I have illustrated preferred embodiments of my invention by way of illustration, many modifications will occur to those skilled in the art and I therefore wish to have it understood that I intend in the appended claims to cover all such modifications as fall within the true spirit and scope of my invention.

What is claimed as new and desired to be secured by Letters Patent of the United States is:

1. A sequence network circuit for use in combination with a three-phase (X, Y, Z) a-c power system, which comprises:
   (a) input circuit means for receiving: (1) three separate input signals respectively representative of the phase-to-neutral voltage in the three phases (X, Y, Z) and a fourth input signal representative of the negative of the zero sequence voltage therein, said input signals having a common reference potential; or, (2) three separate input signals respectively representative of the line current in the three phases (X, Y, Z) and a fourth input signal representative of the negative of the zero sequence current in the system, said input signals having a common reference potential;
   (b) signal processing means receiving said input signals and comprising:
      (1) an operational amplifier having a non-inverting input adapted to be coupled to the reference potential and an inverting input coupled to its output through a feedback resistor $R_F$,
      (2) a capacitor C, one side of which is adapted to be coupled to the reference potential and the other side of which is coupled to a junction 14,
      (3) a resistor $R_5$ coupled between the junction 14 and the inverting input of the operational amplifier with a summing point 16 being provided between resistor $R_5$ and the inverting input,
      (4) a resistor $R_{1A}$ coupling a first one of the three input signals to summing point 16 and a resistor $R_{1B}$ coupling said first input signal to junction 14 independently of said resistor $R_{1A}$, said first input signal comprising a reference input signal $E_X$,
      (5) a resistor $R_{2A}$ coupling a second one of the three input signals to summing point 16 independently of junction 14,
      (6) a resistor $R_{3B}$ coupling a third one of the three input signals to junction 14,
      (7) a resistor $R_{4A}$ coupling the fourth input signal to summing point 16 and a resistor $R_{4B}$ coupling the fourth input signal to junction 14,
wherein the values of the components in the circuit are selected such that the output signal E of the operational amplifier is representative of $(E_{X1}-E_{X2}) \angle -180°$, where $E_{X1}$ is the positive sequence component of the reference input signal $E_X$, $E_{X2}$ is the negative sequence component of the reference input signal $E_X$, and $\angle -180°$ represents a 180 degree lagging relationship with respect to $E_X$.

2. A sequence network circuit for use in combination with a three-phase (X, Y, Z) a-c power system, which comprises:
   (a) input circuit means for receiving: (1) three separate input signals respectively representative of the phase-to-neutral voltage in the three phases (X, Y, Z) and a fourth input signal representative of the negative of the zero sequence voltage therein, said input signals having a common reference potential; or, (2) three separate input signals respectively representative of the line current in the three phases (X, Y, Z) and a fourth input signal representative of the negative of the zero sequence current in the system, said input signals having a common reference potential;

(b) signal processing means receiving said input signals and comprising:
  (1) an operational amplifier having a non-inverting input adapted to be coupled to the reference potential and an inverting input coupled to its output through a feedback resistor $R_F$,
  (2) a capacitor C, one side of which is adapted to be coupled to the reference potential and the other side of which is coupled to a junction 14,
  (3) a resistor $R_5$ coupled between the junction 14 and the inverting input of the operational amplifier with a summing point 16 being provided between resistor $R_5$ and the inverting input,
  (4) a resistor $R_{1A}$ coupling a first one of the three input signals to summing point 16 and a resistor $R_{1B}$ coupling said first input signal to junction 14 independently of said resistor $R_{1A}$, said first input signal comprising a reference input signal $E_X$,
  (5) a resistor $R_{2A}$ coupling a second one of the three input signals to summing point 16 independently of junction 14,
  (6) a resistor $R_{3B}$ coupling a third one of the three input signals to junction 14,
  (7) a resistor $R_{4A}$ coupling the fourth input signal to summing point 16 and a resistor $R_{4B}$ coupling the fourth input signal to junction 14,
wherein the values of the components in the circuit are selected such that the output signal E of the operational amplifier is representative of the reference input signal $E_X$ summed with a constant $K_1$ times the positive sequence component of the reference input signal $E_X$, the sum having a 180° phase reversal with respect to $E_X$.

3. A sequence network circuit for use in combination with a three-phase (X, Y, Z) a-c power system, which comprises:
  (a) input circuit means for receiving: (1) three separate input signals having a common reference potential respectively representative of the phase-to-phase voltage in the three phases (X, Y, Z); or, (2) three separate input signals having a common reference potential representative of the delta currents in the three phases (X, Y, Z);
  (b) signal processing means receiving said input signals and comprising:
    (1) an operational amplifier having a non-inverting input adapted to be coupled to the reference potential and an inverting input coupled to its output through a feedback resistor $R_F$,
    (2) a capacitor C, one side of which is adapted to be coupled to the reference potential and the other side of which is coupled to a junction 14,
    (3) a resistor $R_5$ coupled between the junction 14 and the inverting input of the operational amplifier with a summing point 16 being provided between resistor $R_5$ and the inverting input,
    (4) a resistor $R_{6A}$ coupling a first one of the three input signals to summing point 16 and a resistor $R_{6B}$ coupling the first input signal to junction 14 independently of said resistor $R_{6A}$, said first input signal comprising a reference input signal $E_X$,
    (5) a resistor $R_{7A}$ coupling a second one of the three input signals to summing point 16 independently of junction 14,
    (6) a resistor $R_{8B}$ coupling a third one of the three input signals to junction 14,
wherein the values of the components in the circuit are selected such that the output signal E of the operational amplifier is representative of the reference input signal $E_X$ summed with a constant $K_1$ times the positive sequence component of the reference input signal $E_X$, the sum having a 180° phase reversal with respect to $E_X$.

4. A sequence network circuit in accordance with claims 1, 2, or 3 in which the relationship of the value of feedback resistor $R_F$ to the other circuit components results in one per unit output magnitude when the input signals represent a balanced three-phase voltage set.

5. A sequence network circuit in accordance with claims 1, 2, or 3 in which said second and third input signals are interchanged.

6. A sequence network circuit in accordance with claims 2 or 3 in which said values of the components in the circuit are selected such that the output signal E of the operational amplifier is representative of substantially only the positive sequence component of the reference input signal.

7. A sequence network circuit for use in combination with a three-phase (X, Y, Z) a-c power system, which comprises:
  (a) input circuit means for receiving: (1) three separate input signals respectively representative of the phase-to-neutral voltage in the three phases (X, Y, Z) and a fourth input signal representative of the negative of the zero sequence voltage therein, said input signals having a common reference potential; or, (2) three separate input signals respectively representative of the line current in the three phases (X, Y, Z) and a fourth input signal representative of the negative of the zero sequence current in the system, said input signals having a common reference potential;
  (b) signal processing means comprising:
    (1) an operational amplifier having a non-inverting input coupled to the reference potential and an inverting input coupled to its output through a feedback resistor $R_F$,
    (2) a capacitor C, one side of which is coupled to the reference potential and the other side of which is coupled to a junction 14,
    (3) a resistor $R_5$ coupled between the junction 14 and the inverting input of the operational amplifier with a summing point 16 being provided between resistor $R_5$ and the inverting input,
    (4) a resistor $R_{1B}$ coupling a first one of the three input signals to junction 14, said first input signal comprising a reference input signal,
    (5) a resistor $R_{2A}$ coupling a second one of the three input signals to summing point 16 and a resistor $R_{2B}$ coupling the second input signal to junction 14,
    (6) a resistor $R_{3A}$ coupling the third one of the three input signals to summing point 16 and a resistor $R_{3B}$ coupling the third input signal to junction 14,
    (7) a resistor $R_{4A}$ coupling the fourth input signal to summing point 16 and a resistor $R_{4B}$ coupling the fourth input signal to junction 14,
wherein the values of the components in the circuit are selected such that the output signal E of the operational amplifier is representative of the reference input signal summed with a constant $K_1$ times the positive sequence component of the reference input signal, the sum being at 0° with respect to the reference input signal.

8. A sequence network circuit in accordance with claim 7 in which the following relationships are present:

| Component | Relationship |
|---|---|
| Resistor | |
| $R_{2A}$ | $(2 + K_1)(16/\sqrt{3})X_C$ |
| $R_{3A}$ | $((2 + K_1)/(1 + K_1))(16/\sqrt{3})X_C$ |
| $R_{4A}$ | $((2 + K_1)/(3 + K_1))(16/\sqrt{3})X_C$ |
| $R_{1B}$ | $(12/\sqrt{3})X_C$ |
| $R_{2B}$ | $((2 + K_1)/(1 + K_1))(6/\sqrt{3})X_C$ |
| $R_{3B}$ | $(2 + K_1)(6/\sqrt{3})X_C$ |
| $R_{4B}$ | $(4/\sqrt{3})X_C$ |
| $R_5$ | $(2/\sqrt{3})X_C$ |
| Capacitor C | $1/(2\pi f X_C)$ | wherein $X_C$ is any arbitrary value and $K_1$ is chosen in accordance with $-1 < K_1$.

9. A sequence network circuit in accordance with claim 7 in which the following component values are assigned:

| Component | Approximate Value (kΩ) |
|---|---|
| Resistor $R_{2A}$ | 56.2 |
| $R_{3A}$ | 43.2 |
| $R_{4A}$ | 16.9 |
| $R_{1B}$ | 18.2 |
| $R_{2B}$ | 16.2 |
| $R_{3B}$ | 21.0 |
| $R_{4B}$ | 6.04 |
| $R_5$ | 3.01 |

10. A sequence network circuit for use in combination with a three-phase (X, Y, Z) a-c power system, which comprises:
 (a) input circuit means for receiving: (1) three separate input signals having a common reference potential respectively representative of the phase-to-phase voltage in the three phases (X, Y, Z); or, (2) three separate input signals having a common reference potential representative of the delta currents in the three phases (X, Y, Z);
 signal processing means comprising:
  (1) an operational amplifier having a non-inverting input adapted to be coupled to the reference potential and an inverting input coupled to its output through a feedback resistor $R_F$,
  (2) a capacitor C, one side of which is adapted to be coupled to the reference potential and the other side of which is coupled to a junction 14,
  (3) a resistor $R_5$ coupled between the junction 14 and the inverting input of the operational amplifier with a summing point 16 being provided between resistor $R_5$ and the inverting input,
  (4) a resistor $R_{6B}$ coupling a first one of the three input signals to junction 14, said first input signal comprising a reference input signal,
  (5) a resistor $R_{7A}$ coupling a second one of the three input signals to summing point 16 and a resistor $R_{7B}$ coupling the second input signal to junction 14,
  (6) a resistor $R_{8A}$ coupling a third one of the three input signals to summing point 16 and a resistor $R_{8B}$ coupling the third input signal to junction 14, wherein the values of the components are selected such that the output signal E of the operational amplifier is representative of the reference input signal summed with a constant $K_1$ times the positive sequence component of the reference input signal, the sum being at 0° with respect to the reference input signal.

11. A sequence network circuit in accordance with claim 10 in which the following relationships are present:

| Component | Relationship |
|---|---|
| Resistor $R_{7A}$ | $(2 + K_1)(8/\sqrt{3})X_C$ |
| $R_{8A}$ | $((2 + K_1)/(1 + K_1))(8/\sqrt{3})X_C$ |
| $R_{6B}$ | $(6/\sqrt{3})X_C$ |
| $R_{7B}$ | $((2 + K_1)/(1 + K_1))(3/\sqrt{3})X_C$ |
| $R_{8B}$ | $(2 + K_1)(3/\sqrt{3})X_C$ |
| $R_5$ | $(2/\sqrt{3})X_C$ |
| Capacitor C | $1/(2\pi f X_C)$ | wherein $X_C$ is any arbitrary value and $K_1$ is chosen in accordance with $-1 < K_1$.

12. A sequence network circuit in accordance with claim 10 in which the following component values are assigned:

| Component | Approximate Value (KΩ) |
|---|---|
| Resistor $R_{7A}$ | 28.0 |
| $R_{8A}$ | 21.5 |
| $R_{6B}$ | 9.09 |
| $R_{7B}$ | 8.06 |
| $R_{8B}$ | 10.5 |
| $R_5$ | 3.01 |

13. A sequence network circuit in accordance with claims 7 or 10 in which the relationship of the value of feedback resistor $R_F$ to the other circuit components results in one per unit output magnitude when the input signals represent a balanced three-phase voltage set.

14. A sequence network circuit in accordance with claims 7 or 10 in which said second and third input signals are interchanged.

15. A sequence network circuit in accordance with claims 7 or 10 in which said values of the components in the circuit are selected such that the output signal E of the operational amplifier is representative of substantially only the positive sequence component of the reference input signal.

16. A sequence network circuit for use in combination with a three-phase (X, Y, Z) a-c power system, which comprises:
 (a) input circuit means for receiving: (1) three separate input signals respectively representative of the phase-to-neutral voltage in the three phases (X, Y, Z) and a fourth input signal representative of the negative of the zero sequence voltage therein, said input signals having a common reference potential; or, (2) three separate input signals respectively representative of the line current in the three phases (X, Y, Z) and a fourth input signal representative of the negative of the zero sequence current in the system, said input signals having a common reference potential;

(b) signal processing means comprising:
(1) an operational amplifier having a non-inverting input adapted to be coupled to the reference potential and an inverting input coupled to its output through a feedback resistor $R_F$,
(2) a capacitor C, one side of which is adapted to be coupled to the reference potential and the other side of which is coupled to a junction 14,
(3) a resistor $R_5$ coupled between the junction 14 and the inverting input of the operational amplifier with a summing point 16 being provided between resistor $R_5$ and the inverting input,
(4) a resistor $R_{1A}$ coupling a first one of the three input signals to summing point 16 and a resistor $R_{1B}$ coupling said first input signal to junction 14, said first input signal comprising a reference signal,
(5) a resistor $R_{2A}$ coupling a second one of the three input signals to summing point 16,
(6) a resistor $R_{3B}$ coupling a third one of the three input signals to junction 14,
(7) a resistor $R_{4A}$ coupling the fourth input signal to summing point 16 and a resistor $R_{4B}$ coupling the fourth input signal to junction 14, wherein the values of the components in the circuit are selected such that the output signal E of the operational amplifier is representative of the quadrature voltage with respect to the reference input signal of (b) (4), and shifted 90° lagging with respect to said quadrature voltage; and in which the following relationships are present:

| Component | Relationship |
|---|---|
| Resistor $R_{1A}$ | $(64/3) X_C$ |
| $R_{2A}$ | $(32/3) X_C$ |
| $R_{4A}$ | $(64/9) X_C$ |
| $R_{1B}$ | $(8) (1 + S) X_C$ |
| $R_{3B}$ | $(4) (1 + S) X_C$ |
| $R_{4B}$ | $(8/3) (1 + S) X_C$ |
| $R_5$ | $(4/3) (1 - S) X_C$ |
| Capacitor C | $1/2 \pi f X_c$ | wherein S is assigned the fixed numeric value:

$$S = \sqrt{1 - \sqrt{3/2}} \; ;$$

17. A sequence network circuit for use in combination with a three-phase (X, Y, Z) a-c power system, which comprises:

(a) input circuit means for receiving: (1) three separate input signals respectively representative of the phase-to-neutral voltage in the three phases (X, Y, Z) and a fourth input signal representative of the negative of the zero sequence voltage therein, said input signals having a common reference potential; or, (2) three separate input signals respectively representative of the line circuit in the three phases (X, Y, Z) and a fourth input signal representative of the negative of the zero sequence current in the system, said input signals having a common reference potential;

(b) signal processing means comprising:
(1) an operational amplifier having a non-inverting input adapted to be coupled to the reference potential and an inverting input coupled to its output through a feedback resistor $R_F$,
(2) a capacitor C, one side of which is adapted to be coupled to the reference potential and the other side of which is coupled to a junction 14,
(3) a resistor $R_5$ coupled between the junction 14 and the inverting input of the operational amplifier with a summing point 16 being provided between resistor $R_5$ and the inverting input,
(4) a resistor $R_{1A}$ coupling a first one of the three input signals to summing point 16 and a resistor $R_{1B}$ coupling said first input signal to junction 14, said first input signal comprising a reference signal,
(5) a resistor $R_{2A}$ coupling a second one of the three input signals to summing point 16,
(6) a resistor $R_{3B}$ coupling a third one of the three input signals to juncton 14,
(7) a resistor $R_{4A}$ coupling the fourth input signal to summing point 16 and a resistor $R_{4B}$ coupling the fourth input signal to junction 14, wherein the values of the components in the circuit are selected such that the output signal E of the operational amplifier is representative of the quadrature voltage with respect to the reference input signal of (b) (4), and shifted 90° lagging with respect to said quadrature voltage and in which the following component values are assigned:

| Component | Approximate Value (KΩ) |
|---|---|
| Resistor $R_{1A}$ | 56.2 |
| $R_{2A}$ | 28.0 |
| $R_{4A}$ | 18.7 |
| $R_{1B}$ | 28.7 |
| $R_{3B}$ | 14.3 |
| $R_{4B}$ | 9.53 |
| $R_5$ | 2.21 |

18. A sequence network circuit for use in combination with a three-phase (X, Y, Z) a-c power system, which comprises:

(a) input circuit means for receiving: (1) three separate input signals respectively representative of the phase-to-neutral voltage in the three phases (X, Y, Z) and a fourth input signal representative of the negative of the zero sequence voltage therein, said input signals having a common reference potential; or, (2) three separate input signals respectively representative of the line current in the three phases (X, Y, Z) and a fourth input signal representative of the negative of the zero sequence current in the system, said input signals having a common reference potential;

(b) signal processing means comprising:
(1) an operational amplifier having a non-inverting input adapted to be coupled to the reference potential and an inverting input coupled to its output through a feedback resistor $R_F$,
(2) a capacitor C, one side of which is adapted to be coupled to the reference potential and the other side of which is coupled to a junction 14, (3) a resistor $R_5$ coupled between the junction 14 and the inverting input of the operational amplifier with a summing point 16 being provided between resistor $R_5$ and the inverting input, (4) a resistor $R_{1A}$ coupling a first one of the three input signals to summing point 16 and a resistor $R_{1B}$ coupling said first input signal to junction 14, said first input signal comprising a reference input signal, (5) a resistor $R_{2A}$ coupling a second one of the three input signals to summing point 16, (6) a resistor $R_{3B}$ coupling a third one of the three input signals to junction 14, (7) a resistor $R_{4A}$ coupling the fourth input signal to summing point 16 and a resistor $R_{4B}$ coupling the fourth input signal to junction 14, wherein the values of the components in the circuit are selected such that the output signal E of the operational amplifier is representative of the reference input signal summed with a constant $K_1$ times the positive sequence component of the reference input signal, the sum having a 180° phase reversal with respect to the reference input signal and in which the following relationships are present:

| Component | | Relationship |
|---|---|---|
| Resistor | $R_{1A}$ | $(K_1/(1+K_1))(16/\sqrt{3})X_C$ |
| | $R_{2A}$ | $(16/\sqrt{3})X_C$ |
| | $R_{4A}$ | $(8/\sqrt{3})X_C$ |
| | $R_{1B}$ | $(12/\sqrt{3})X_C$ |
| | $R_{3B}$ | $(6/\sqrt{3})X_C$ |
| | $R_{4B}$ | $(4/\sqrt{3})X_C$ |
| | $R_5$ | $(2/\sqrt{3})X_C$ |
| Capacitor | C | $1/(2\pi f X_C)$. | wherein $X_C$ is any arbitrary value and $K_1$ may be chosen in accordance with $-1 < (1/K_1) < \infty$.

19. A sequence network circuit for use in combination with a three-phase (X, Y, Z) power system, which comprises:

(a) input circuit means for receiving: (1) three separate input signals respectively representative of the phase-to-neutral voltage in the three phases (X, Y, Z) and a fourth input signal representative of the negative of the zero sequence voltage therein, said input signals having a common reference potential; or, (2) three separate input signals respectively representative of the line current in the three phases (X, Y, Z) and a fourth input signal representative of the negative of the zero sequence current in the system, said input signals having a common reference potential;

(b) signal processing means comprising:

(1) an operational amplifier having a non-inverting input adapted to be coupled to the reference potential and an inverting input coupled to its output through a feedback resistor $R_F$, (2) a capacitor C, one side of which is adapted to be coupled to the reference potential and the other side of which is coupled to a junction 14, (3) a resistor $R_5$ coupled between the junction 14 and the inverting input of the operational amplifier with a summing point 16 being provided between resistor $R_5$ and the inverting input, (4) a resistor $R_{1A}$ coupling a first one of the three input signals to summing point 16 and a resistor $R_{1B}$ coupling said first input signal to junction 14, said first input signal comprising a reference input signal, (5) a resistor $R_{2A}$ coupling a second one of the three input signals to summing point 16, (6) a resistor $R_{3B}$ coupling a third one of the three input signals to junction 14, (7) a resistor $R_{4A}$ coupling the fourth input signal to summing point 16 and a resistor $R_{4B}$ coupling the fourth input signal to junction 14, wherein the values of the components in the circuit are selected such that the output signal E of the operational amplifier is representative of the reference input signal summed with a constant $K_1$ times the positive sequence component of the reference input signal, the sum having a 180° phase reversal with respect to the reference input signal and in which the following component values are assigned:

| Component | | Approximate Value (KΩ) |
|---|---|---|
| Resistor | $R_{1A}$ | 5.62 |
| | $R_{2A}$ | 24.3 |
| | $R_{4A}$ | 12.1 |
| | $R_{1B}$ | 18.2 |
| | $R_{3B}$ | 9.09 |
| | $R_{4B}$ | 6.04 |
| | $R_5$ | 3.01 |

20. A sequence network circuit for use in combination with a three phase (X, Y, Z) a-c power system, which comprises:

(a) input circuit means for receiving: (1) three separate input signals having a common reference potential respectively representative of the phase-to-phase voltage in the three phases (X, Y, Z); or, (2) three separate input signals having a common reference potential representative of the delta currents in the three phases (X, Y, Z);

(b) signal processing means comprising:

(1) an operational amplifier having a non-inverting input adapted to be coupled to the reference potential and an inverting input coupled to its output through a feedback resistor $R_F$, (2) a capacitor C, one side of which is adapted to be coupled to the reference potential and the other side of which is coupled to a junction 14, (3) a resistor $R_5$ coupled between the junction 14 and the inverting input of the operational amplifier with a summing point 16 being provided between resistor $R_5$ and the inverting input, (4) a resistor $R_{6A}$ coupling a first one of the three input signals to summing point 16 and a resistor $R_{6B}$ coupling the first input signal to junction 14, said first input signal comprising a reference input signal, (5) a resistor $R_{7A}$ coupling a second one of the three input signals to summing point 16,
(6) a resistor $R_{8B}$ coupling a third one of the three input signals to junction 14, wherein the values of the components in the circuit are selected such that the output signal E of the operational amplifier is representative of the reference input signal summed with a constant $K_1$ times the positive sequence component of the reference input signal, the sum having a 180° phase reversal with respect to the reference input signal and in which the following relationships are present:

| Component | | Relationship |
|---|---|---|
| Resistor | $R_{6A}$ | $(K_1/(1 + K_1))(8/\sqrt{3})X_C$ |
| | $R_{7A}$ | $(8/\sqrt{3})X_C$ |
| | $R_{6B}$ | $(6/\sqrt{3})X_C$ |
| | $R_{8B}$ | $(3/\sqrt{3})X_C$ |
| | $R_5$ | $(2/\sqrt{3})X_C$ |
| Capacitor | C | $1/(2\pi f X_C)$, | where $X_C$ is any arbitrary value and $K_1$ is chosen in accordance with $-1<(1/K_1)<\infty$.

21. A sequence network circuit for use in combination with a three-phase (X, Y, Z) a-c power system, which comprises:
(a) input circuit means for receiving: (1) three separate input signals having a common reference potential respectively representative of the phase-to-phase voltage in the three phases (X, Y, Z); or, (2) three separate input signals having a common reference potential representative of the delta currents in the three phases (X, Y, Z);
(b) signal processing means comprising:
(1) an operational amplifier having a non-inverting input adapted to be coupled to the reference potential and an inverting input coupled to its output through a feedback resistor $R_F$,
(2) a capacitor C, one side of which is adapted to be coupled to the reference potential and the other side of which is coupled to a junction 14,
(3) a resistor $R_5$ coupled between the junction 14 and the inverting input of the operational amplifier with a summing point 16 being provided between resistor $R_5$ and the inverting input,
(4) a resistor $R_{6A}$ coupling a first one of the three input signals to summing point 16 and a resistor $R_{6B}$ coupling the first input signal to junction 14, said first input signal comprising a reference input signal,
(5) a resistor $R_{7A}$ coupling a second one of the three input signals to summing point 16,
(6) a resistor $R_{8B}$ coupling a third one of the three input signals to junction 14, wherein the values of the components in the circuit are selected such that the output signal E of the operational amplifier is representative of the reference input signal summed with a constant $K_1$ times the positive sequence component of the reference input signal, the sum having a 180° phase reversal with respect to the reference input signal, and in which the following component values are assigned:

| Component | | Approximate Value (KΩ) |
|---|---|---|
| Resistor | $R_{6A}$ | 2.87 |
| | $R_{7A}$ | 12.7 |
| | $R_{6B}$ | 9.09 |
| | $R_{8B}$ | 4.64 |
| | $R_5$ | 3.01 |

22. A sequence network circuit for use in combination with a three-phase (X, Y, Z) a-c power system, which comprises:
(a) input circuit means for receiving: (1) three separate input signals respectively representative of the phase-to-neutral voltage in the three phases (X, Y, Z) and a fourth input signal representative of the negative of the zero sequence voltage therein, said input signals having a common reference potential; or, (2) three separate input signals respectively representative of the line current in the three phases (X, Y, Z) and a fourth input signal representative of the negative of the zero sequence current in the system, said input signals having a common reference potential;
(b) signal processing means receiving said input signals and comprising:
(1) an operational amplifier having a non-inverting input adapted to be coupled to the reference potential and an inverting input coupled to its output through a feedback resistor $R_F$,
(2) a capacitor C, one side of which is adapted to be coupled to the reference potential and the other side of which is coupled to a junction 14,
(3) a resistor $R_5$ coupled between the juntion 14 and the inverting input of the operational amplifier with a summing point 16 being provided between resistor $R_5$ and the inverting input,
(4) a resistor $R_{1B}$ coupling a first one of the three input signals to junction 14, said first input signal comprising a reference input signal $E_X$,
(5) a resistor $R_{2A}$ coupling a second one of the three input signals to summing point 16 independently of junction 14,
(6) a resistor $R_{3B}$ coupling a third one of the three input signals to junction 14,
(7) a resistor $R_{4A}$ coupling the fourth input signal to summing point 16 and a resistor $R_{4B}$ coupling the fourth input signal to junction 14, wherein the values of the components in the circuit are selected such that the output signal E of the operational amplifier is representative of the negative sequence component of the reference input signal $E_X$ summed with the zero sequence component, the sum being at 0° with respect to $E_X$.

23. A sequence network circuit for use in combination with a three-phase (X, Y, Z) a-c power system, which comprises:
(a) input circuit means for receiving: (1) three separate input signals having a common reference potential respectively representative of the phase-to-phase voltage in the three phases (X, Y, Z); or, (2) three separate input signals having a common reference potential representative of the delta currents in the three phases (X, Y, Z);

(b) signal processing means receiving said input signals and comprising:
  (1) an operational amplifier having a non-inverting input adapted to be coupled to the reference potential and an inverting input coupled to its output through a feedback resistor $R_F$,
  (2) a capacitor C, one side of which is adapted to be coupled to the reference potential and the other side of which is coupled to a junction 14,
  (3) a resistor $R_5$ coupled between the junction 14 and the inverting input of the operational amplifier with a summing point 16 being provided between resistor $R_5$ and the inverting input,
  (4) a resistor $R_{6B}$ coupling a first one of the three input signals to junction 14, said first input signal comprising a reference input signal $E_X$,
  (5) a resistor $R_{7A}$ coupling a second one of the three input signals to summing point 16 independently of junction 14,
  (6) a resistor $R_{8B}$ coupling a third one of the three input signals to junction 14,
wherein the values of the components in the circuit are selected such that the output signal E of the operational amplifier is representative of the negative sequence component of the reference input signal $E_X$ at 0° with respect to $E_X$.

* * * * *

UNITED STATES PATENT AND TRADEMARK OFFICE
CERTIFICATE OF CORRECTION

PATENT NO. : 4,342,062   Page 1 of 2
DATED : July 27, 1982
INVENTOR(S) : Merwyn E. Hodges It is certified that error appears in the above-identified patent and that said Letters Patent are hereby corrected as shown below:

Column 4, line 18, change "=" to -x-

Column 5, line 31, change "$\lambda$" to -$\pi$-

Column 8, line 53, change "190" to -#-

Column 8, line 67, change "190" (both occurrences) to -#-

Column 9, line 25, change "190" to -#-

Column 9, line 38, change "$\angle 1/2°$" to -$\angle 180°$-

Column 15, line 54, change "$S = \sqrt{1 - \sqrt{3/2}}$" to $$-S = \sqrt{1 - \sqrt{3/2}} -$$

Column 15, line 54, after the semicolon (;) add -and $X_c$ is any arbitrary value.-

UNITED STATES PATENT AND TRADEMARK OFFICE
CERTIFICATE OF CORRECTION

PATENT NO. : 4,342,062

DATED : July 27, 1982

INVENTOR(S) : Merwyn E. Hodges

It is certified that error appears in the above-identified patent and that said Letters Patent are hereby corrected as shown below:

Column 17, lines 28 and 29, the terms $(K_1 (1+K_1))$ and $(16/\sqrt{3}) X_C$ should appear on the same line immediately adjacent each other and as follows:

$$- (K_1 + (1+K_1)) \quad (16/\sqrt{3}) X_C -$$

Column 19, lines 15 and 16, the terms $(K_1 (1+K_1))$ and $(8/\sqrt{3}) X_C$ should appear on the same line immediately adjacent each other and as follows:

$$- (K_1 (1+K_1)) (8/\sqrt{3}) X_C -$$

Signed and Sealed this

Eighth Day of February 1983

[SEAL]

Attest:

GERALD J. MOSSINGHOFF

Attesting Officer

Commissioner of Patents and Trademarks